March 28, 1961 A. G. BADE 2,976,745
MOUNTING ASSEMBLY FOR MACHINERY DRIVE
Filed Sept. 3, 1959 5 Sheets-Sheet 1
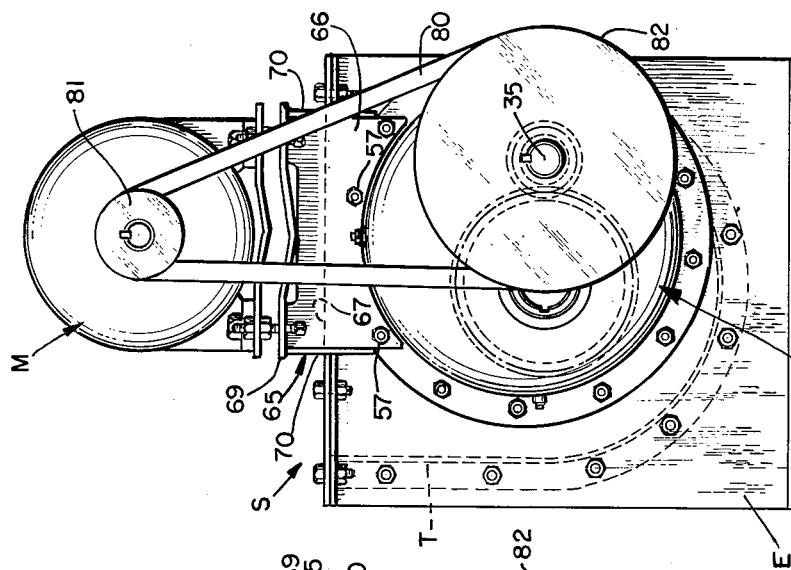
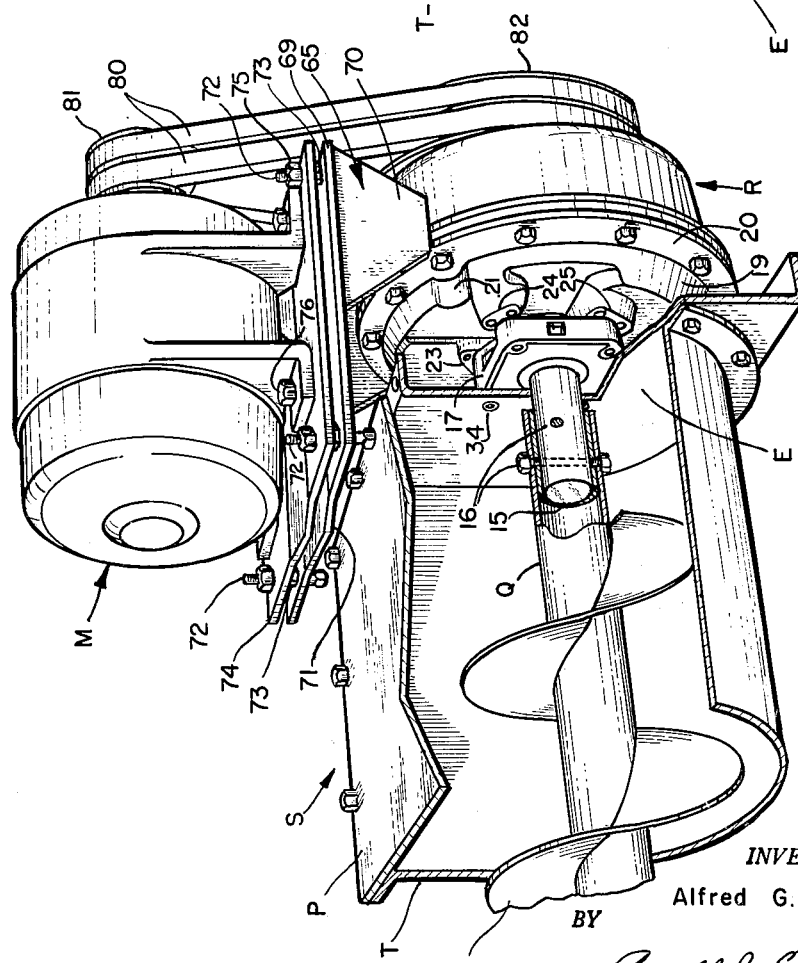
INVENTOR.
Alfred G. Bade
BY
Arnold J. Ericsen
Attorney

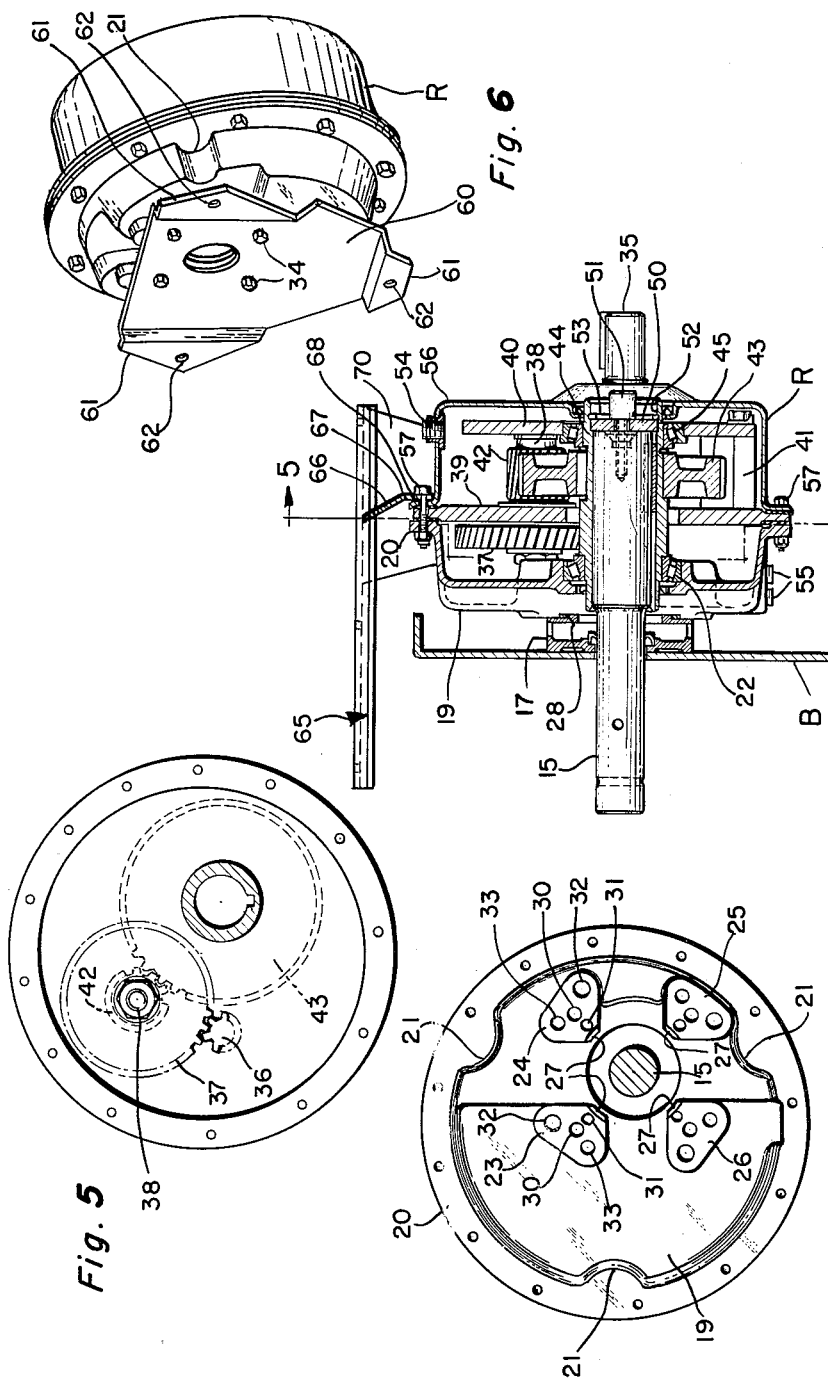

INVENTOR.
Alfred G. Bade

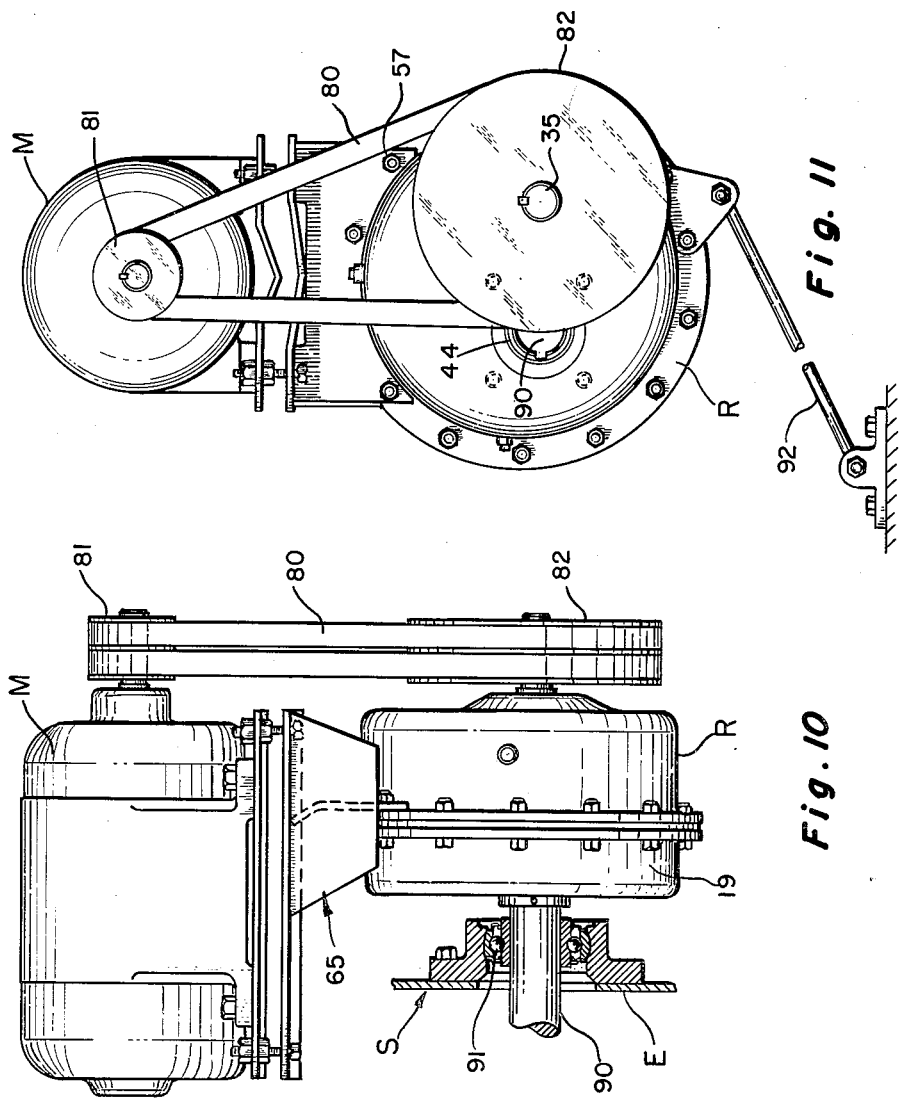

March 28, 1961  A. G. BADE  2,976,745
MOUNTING ASSEMBLY FOR MACHINERY DRIVE
Filed Sept. 3, 1959  5 Sheets-Sheet 5

INVENTOR.
Alfred G. Bade
BY
Attorney

United States Patent Office 2,976,745
Patented Mar. 28, 1961

2,976,745

MOUNTING ASSEMBLY FOR MACHINERY DRIVE

Alfred G. Bade, Brookfield, Wis., assignor to The Falk Corporation, Milwaukee, Wis., a corporation of Wisconsin Filed Sept. 3, 1959, Ser. No. 837,939

8 Claims. (Cl. 74—606)

The present invention relates to a machinery drive, and is particularly directed to means for mounting a drive as a unit, either in the form of a flange mounted speed reducer combined with a motor mounted directly thereon, or as a shaft mounted speed reducer with a motor mounted directly thereto.

Heretofore, speed reducers and motors used therewith have been mounted separately of one another, as in the case of screw conveyors or other machinery installations, wherein a rather large torque reaction component is present. Such installations have included both flange or shaft mounted speed reducers, being attached either directly to one end plate of a screw conveyor or stationary mounting plate of other machinery by means of flange mounting or, in the alternative, to a shaft protruding therefrom. The motor has either been mounted at the floor level at the side of the speed reducer, or to the top of the machine, such as resting directly upon the cleanout plate of a screw conveyor, or on other portions where it often interfered with removal and replacement of machinery parts. In either case, the torque reaction components of the motor and reducer introduced considerable strain and stress upon the mounting support.

It is an object of the present invention to provide a mounting assembly for a machinery drive, wherein the prime mover or motor may be mounted directly upon an encircling flanged portion of a speed reducer housing in a manner permitting a counterpoised design, wherein the center of gravity of the motor is disposed to cancel out the effects of belt pull which normally reverts back to the foundation bolts, and wherein the overhang from motor weight to the point of anchorage of the foundation bolts, which secure the reducer unit to its stationary mounting support, is kept to a minimum.

It is another object of this invention to provide a machinery drive assembly wherein standard motors and speed reducer units may be used and adapted to be assembled as a combined unit arranged for direct application to numerous machine mountings, and requiring only a minimum amount of lateral spacing to either side or above or below the drive elements.

It is a further object of the present invention to provide a universal mounting pad having a choice of motor bolting holes and adjustable support plate therefor, whereby a series of motors may be used with a standard plate and immediate adjustment of belt tension may be made without requiring the removal of the motor from the assembled unit.

It is still another object of the present invention to provide an improved housing plate for a flange mounted speed reducer having a choice of bolting holes, arranged in a "clover leaf" pattern, to fit a series of oil retainer housings or machinery mounting supports, and which are adaptable to gudgeons of varying diameters.

A still further object of the present invention lies in the provision of a removable gudgeon or drive shaft for a speed reducer, thereby eliminating the need for separate drive-end shafts for screw conveyors or other machinery, wherein shaft replacement can readily be made in the field without disturbing the gears or other reducer components.

Other more specific objects and advantages will appear, expressed or implied, from the following description of illustrative embodiments of the invention, taken in connection with the drawings, wherein:

Fig. 1 is a perspective view of a screw conveyor wherein the present invention may be embodied as a drive unit and wherein portions thereof are broken away to more clearly illustrate the mounting features;

Fig. 2 is an elevational view taken from one end of the conveyor and indicating the speed reducer with its input shaft in a "three o'clock" mounting position relative thereto;

Fig. 3 is an elevational view of one side of a reducer housing and including flange mounting means;

Fig. 4 is a vertical sectional view of a flange mounted speed reducer attached to a stationary support, and with the motor being removed therefrom;

Fig. 5 is a view taken approximately in the plane of lines 5—5 of Fig. 4 and illustrating the relationship of the intermeshing gears of the speed reducer unit;

Fig. 6 is a perspective view illustrating an adapter mounting plate in assembly with the flange mounted speed reducer;

Fig. 10 is a vertical elevational view illustrating another embodiment in the form of a shaft mounted speed reducer-motor assembly;

Fig. 11 is a front elevational view of the unit of Fig. 10 and illustrating the speed reducer with its input shaft in a "three o'clock" mounting position;

Figure 9:
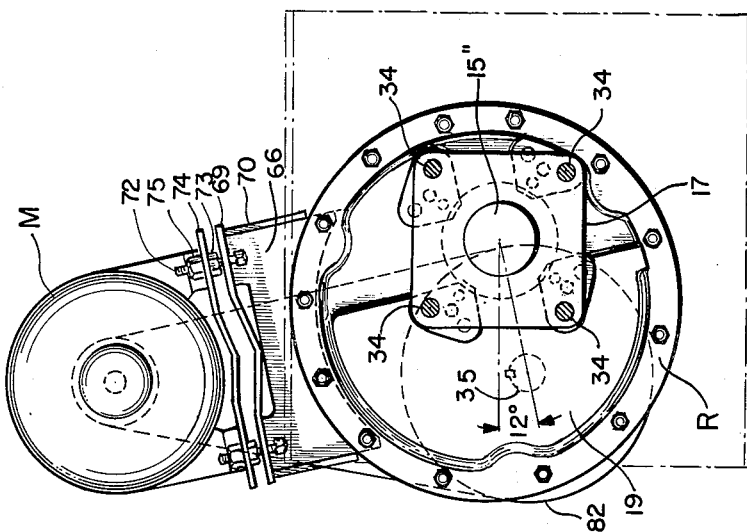
Figs. 7, 8 and 9 illustrate the mounting arrangement of the flange mounted reducer relative to gudgeons of varying diameters protruding from the machinery driven thereby.
Figure 8:
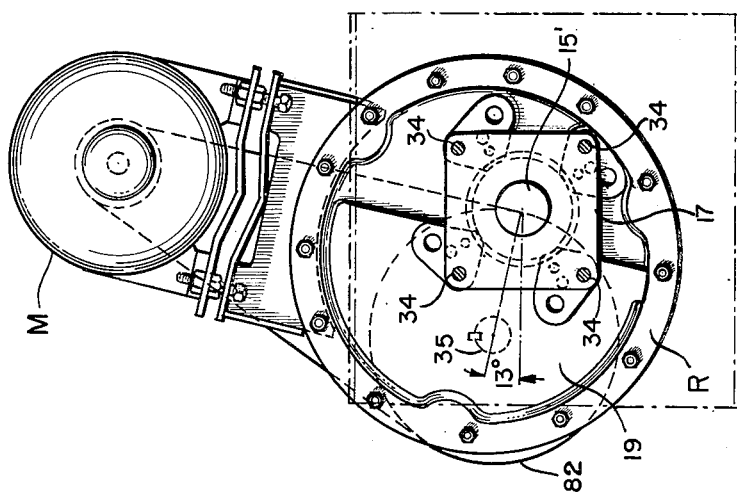

Referring first to the flange mounted speed reducer embodiment of Figs. 1–9, inclusive, Figs. 1 and 2 illustrate a typical mounting installation of a reducer-motor assembly directly to a stationary support of a machine to be driven thereby; in this instance, a screw conveyor S. The conveyor S includes a conventional auger or screw A extending longitudinally therewith and comprising a tubular quill shaft Q arranged to receive a telescoped, inwardly extending drive shaft or gudgeon 15 extending from the speed reducer unit, indicated generally by the reference character R, and mounted therein, as will hereinafter be described. The gudgeon 15 is mounted in driving relationship with the quill Q by means of transversely arranged thru-bolt and nut assemblies 16. The screw conveyor S includes a removable access plate P enclosing an elongated trough T. A motor M is provided for use in driving the screw conveyor in conjunction with the speed reducer R, as will hereinafter be described.

It is to be understood that the herein described assembly may be mounted for use in connection with machines of various types, and that the description of the screw conveyor S is merely set forth as an illustration of a typical application thereof.

The manner of mounting the reducer R directly to the trough and E of the screw conveyor S is most clearly described in connection with the views of Figs. 1, 3, 4 and 7–9, inclusive. In machinery for processing materials which tend to creep or migrate between moving parts, it is often desirable to mount the speed reducer R in combination with a seal retainer housing 17. The seal retainer housing 17 includes an open ended and open sided chamber arranged to receive packing such as waste packing, felt or conventional lip seals to thereby prevent migration of the conveyed material past the oil seal into the bearings and inwardly of the reducer R for contamination of the lubricant therein and damage to the gears thereof. It will be apparent from the following description that the reducer R may be mounted, if so desired, directly to a vertical support, without a retainer member 17 being interposed therebetween (not shown).

Like parts in the various figures are identified by like reference characters.

With particular reference to Figs. 3, 4, 7, 8 and 9, the flange mounting arrangement of the present invention will next be described. The reducer R comprises a two-piece housing including a supporting back plate member 19 having an annular flange 20, which plate member may be of cast construction and defining circumferentially spaced impressions 21 in the raised portion thereof for purposes of providing a non-interfering path with mounting screws as will hereinafter be described in connection with the embodiment of Fig. 6. As shown in Fig. 4, the back plate 19 is apertured and embossed inwardly thereof to receive a supporting bearing 22 for the drive shaft of gudgeon 15. The plate is further provided with flat, "clover leaf" surface mounting pads 23, 24, 25 and 26. The mounting pads 23, 24, 25 and 26 are preferably surface milled, or otherwise machined, to provide a flat mounting surface in the casting. The pads further include stepped arcuate shoulder portions 27 (see Fig. 3), which sectorally define a circle concentrically of the axis of the gudgeon 15 and are arranged to receive protruding mounting portions of the seal retainer housing 17, the larger conventional sizes of which fit the shoulder exactly, and for the smaller sizes an adapter ring 28 is used in conjunction with the retainer housing 17 (see Fig. 4).

As previously stated, the mounting pads 23, 24, 25 and 26 define a "clover leaf" pattern permitting an adjustable mounting arrangement for various diameter gudgeons 15 protruding from the end wall E of various size screw conveyors. For instance, the unit shown is readily adaptable for ready mounting in installations having a range of seal retainer housings 17 and drive shaft diameters of 1½", 2", 2⅞₆" and 3" and for 6, 9, 10, 12, 14, 16, 18 and 20 inch conventional screw conveyor trough ends E.

Figure 7:
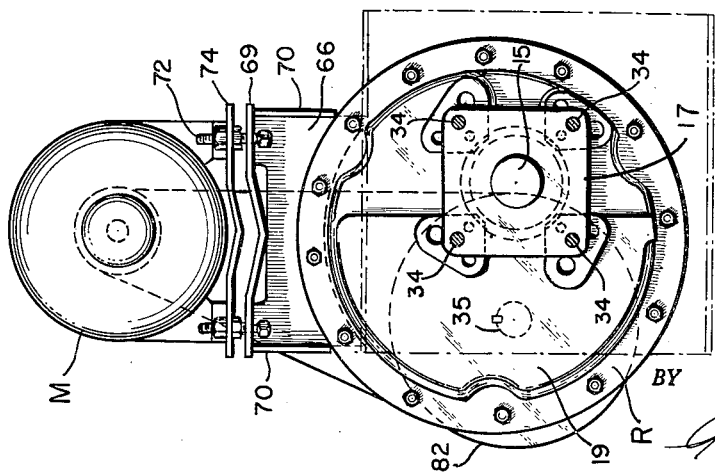

It is to be recalled that it is important that the reducer must be suitably lubricated and vented, and that the lubrication and venting must be so provided, no matter in which mounting position the reducer may be disposed. Thus, the "clover leaf" mounting pad arrangement permits a maximum deviation of only 13 degrees from the perpendicular position shown in Fig. 7 to the position of Fig. 8 to accommodate various gudgeon diameters. Thus, the mounting pads 23, 24, 25 and 26 may respectively include, for present illustrative purposes, four tapped, re-entrant mounting openings 30, 31, 32 and 33 (see Fig. 3). The openings 30 and 31 are concentric with the axis of the gudgeon 15 and are arranged to be mounted relative to 2 inch and 1½ inch drive shaft or gudgeons, respectively. Thus the 2 inch shaft arrangement is specifically illustrated in Fig. 7 with the mounting bolts 34 being shown positioned in threading engagement with the tapped openings 30 and the speed reducer R being positioned in the "three o'clock" position relative to the front side thereof, as shown in Fig. 2. Fig. 7 is illustrative of the rear side of the speed reducer, with the motor M being in substantial vertical alignment relative to the reducer R and the horizontal. As stated previously, the Fig. 7 position of the reducer R and motor M will be the same in the case of a 1½ inch drive shaft installation. In this case the seal retainer housing 17 is mounted to the pads 23, 24, 25 and 26 by means of the threaded openings 31.

The openings 32 and 33, for larger diameter gudgeons, are disposed to either side of the radially aligned openings 30 and 31 in order to permit mounting at a minimum radius from the axis of the gudgeon 15 without causing the reducer to tilt beyond venting and lubrication positions, no matter in which one of four "o'clock" positions it may be disposed.

If it is desired to mount the unit for use with 2⅞₆ inch conventional screw conveyor drive shafts or gudgeons 15', the tapped openings 33 are utilized with the same mounting bolts 34 protruding from the end plate threadingly engaged therewith. In this instance, the unit becomes tilted towards the right, as viewed in Fig. 8, and with the axis of the input shaft 35 being elevated approximately 13 degrees from the horizontal and in a plane coincident with the axis thereof and the axis of the drive shaft 15'. Thus the device will be adequately insured of proper venting and lubrication of bearings and gears despite the 13 degree deviation from the vertical in Fig. 8, the reducer may be varied up to about 15 degrees without necessitating change of vent and drain plugs.

The embodiment of Fig. 9 is illustrative of an application to a 3 inch gudgeon 15" wherein the bolts 34 threadingly engage the openings 32. Here, the deviation of the axis of the input shaft 35 from the horizontal is only 12 degrees. It is further to be observed that though the motor M is angularly displaced, it does not extend beyond a vertical plane tangent with the outermost surface of the reducer R, to permit mounting in confined installations adjacent an upright or a wall.

The speed reducer R, itself, contains known components which may vary depending upon output requirements, except for the hereinafter described output shaft arrangement. For purposes of illustration, the present reducer comprises an input shaft 35, terminating at its internal end in a small gear or pinion 36 (see Fig. 5), which meshes with and drives the gear 37 extending in cantilever fashion from an intermediate shaft 38, which shaft is journalled between a main support member 39 (see Fig. 4) and an auxiliary support member 40. The support members 39 and 40 are preferably parallel with one another and the latter is fastened to the former by means of spaced apart lugs 41 as described in connection with Patent No. 2,762,232, granted to me on September 11, 1956, and assigned to the same assignee as is the present invention. The shaft 38 includes a gear or pinion affixed thereto and arranged to mesh with and drive the low speed gear 43 affixed to a hollow revoluble output shaft 44. The shaft 44 is journalled at one end in the bearing 22 of the housing plate member 19, and at its opposite end in a bearing 45 mounted in an aperture of the auxiliary support member 40.

It will be apparent that the "clover leaf" arrangement of the mounting pads 23, 24, 25 and 26 provides an angular spacing of the pads relative to one another about the output shaft 44 permitting the flange mounted reducer unit to be positioned in any of four mounting positions; i.e., the "three o'clock" position of the input shaft 35 as shown in Fig. 2 and three other angular positions spaced at 90° intervals therefrom (not shown). The same oil level and vent positioning angular deviation limitations will also apply by merely interchanging vent and drain plugs as will hereinafter be described.

Another feature of the present invention permits the use of replaceable gudgeons or drive shafts 15, which are removably secured to the hollow shaft 44, and as shown in Fig. 4, are provided at one end with a circular thrust plate 50 maintained in place by means of a threaded Allen-head screw 51 engaging a tapped hole in the gudgeon 15. The thrust plate rests against a shoulder in an enlarged bore portion 52 and is maintained in place by means of a snap ring 53 engaging an annular groove in the enlarged bore portion 52 of the hollow shaft 44. Thus, the gudgeon 15 may be readily removed and replaced should it become broken or for other maintenance reasons. No other portion of the speed reducer requires disassembly to permit removal of the gudgeon or drive shaft 15.

It is to be further noted that the thrust plate 50, its retaining screw 51 and the snap ring 52 are each accessible from the input side of the reducer, which is the side nearly always exposed. This provides additional ease in removal of the gudgeon 15 from the hollow output shaft 44 without requiring removal of the reducer unit from its support or removal of any of its various components.

With further reference to Fig. 4, a vent plug 54 is provided at the upper end when the reducer R is in the "three o'clock" or "nine o'clock" (not shown) positions and drain plugs 55 are provided at the lower end thereof. A series of drain plugs 55 are positioned at circumferentially spaced positions in the back plate member 19 and the cover 56 of the housing. As the reducer R is rotated about its axis to the various clock positions shown in the several drawings, it will be apparent that the drain plugs 55 and vent plugs 54 are interchanged to always permit a vent plug to be in the uppermost position, in order that lubricant will not drain therefrom and proper venting will be supplied to the unit.

The housing cover plate 56 and the back plate member 19 are each bolted relative to one another through the main support member 39, by means of circumferentially spaced bolt and nut assemblies 57.

The preferred circular construction of the housing of the reducer unit R provides a convenient means for positioning the motor unit M at several operating positions about the reducer unit circumference. This permits greater versatility in mounting arrangements and also permits variations in belt lengths as the motor unit is bolted by means of bolt and nut assemblies 57 to circumferential positions involving variations in radial spacing from the input shaft 35. It will be apparent that other reducer units may also be used which have differing peripheral configurations, but it is preferable to provide a housing having at least a sectoral portion of arcuate curvature to permit angular adjustment of the motor mounting bracket hereinafter described. Such adjustment is simply made by selecting the desired bolt and nut assemblies 57 for mounting the motor at various positions depending upon the circumferential spacings of the openings receiving the assemblies 57.

As shown in the embodiments of Figs. 1–4, the end seal unit 17 and the back plate member 19 of the reducer R are mounted directly to the end plate E by means of bolts 34 extending from within the screw conveyor S at the inner side of the end plate E. In certain instances, it has been found undesirable to permit any portion of the screws to contact the interior of the conveyor S and to provide the interior of end wall E with a smooth surface. Accordingly, the present invention further contemplates the use of an adapter plate 60, as shown in Fig. 6, upon which the reducer R may be directly mounted by means of the screws 34. The adapter 60 may be strengthened by means of the bent mounting ears 61, provided with an S bend to permit the screws 34 to be entirely below the contacting surfaces of the ears 61. Openings 62 are provided for receiving mounting bolts which may engage the usual openings in the end plate E (not shown). As before stated, the back plate housing member 19 is preferably provided with circumferentially disposed impressions 21 for permitting insertion and withdrawal of mounting screws without detaching the plate 60 from the reducer R. Another feature of the adapter plate 60 is that it is designed to extend wholly within the circumference of the reducer R, which is especially useful in confined mounting arrangements. If desired, the ears may be eliminated and the adapter provided with countersunk openings for receiving the heads of the screws 34 (not shown) and thereby provide a flush mounting against end plate E.

Attention is now directed to the motor mounting means in accordance with the practice of the present invention. As illustrated in Figs. 1, 2 and 4, a motor mounting bracket, indicated generally by the reference character 65, includes a mounting plate 66 bent at 67 to provide a strengthening and rigidity means therefor, which plate is preferably curved at its lower ends to conform with the curvature of the reducer housing 56, it being understood that the reducer housing may take various forms other than the circular housing shown. The plate 66 is mounted to the annular flange 68 by means of the same bolt and nut assemblies 57 used to join the back plate housing member 19 and the cover 56 to the main support member 39. A base plate 69 is secured to the opposite edge of the support plate 66 by means of welding or other fastening means, and is further supported by means of the spaced end panels 70 fastened at opposite edges of the support plate 66. The base plate 69 is preferably provided with a strengthening ribbing or deformation 71 intermediate its ends and includes tapped openings for receiving adjusting support screws 72, with their respective threaded ends extending upwardly therefrom, as shown in Figs. 1 and 2. Nuts 73 are next threaded on the extending threaded portions of the screws 72 and an apertured motor bed plate 74 is seated thereover. Nuts 75 are next threaded in place. The motor M may then be attached directly to the bed plate 74 by means of mounting bolts 76 protruding through the feet of the motor M. The motor M is arranged to drive the speed reducer R by means of a belt or belts 80 engaging a drive pulley 81 on the motor at one end and a driven pulley 82 on the shaft 35 of the reducer R. The pulleys are keyed to their respective shafts in the usual manner.

Figure 13:
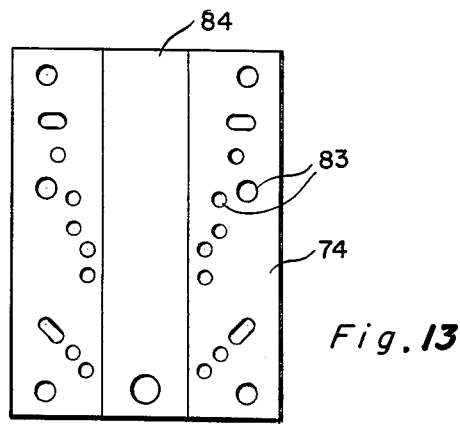
Fig. 13 is a plan view of the motor mounting pad showing the arrangement of openings adaptable for mounting various size motors thereon.

With reference to Fig. 13, the motor bed plate 74 is provided with a series of apertures 33, which in the present instance, accommodate mounting bolts of motors ranging from ½ H.P. to 30 H.P., depending upon reducer size, without necessitating change in bed plate size. The bed plate 74 is further preferably provided with a strengthening means in the form of a depression 84.

Thus, to assure proper tension and alignment, the base plate 69 is provided with individual adjusting screws 72 and the motor is permanently bolted to the plate 74, which reduces the stress and strain on the motor feet. The novel screw and nut combination provides a means wherein the position of the adjusting screw can be varied to provide the take-up allowance and adjustment to maintain proper belt tension. In the case of relatively large motors, the belt take-up is accomplished by loosening the top nut 75 and simultaneously turning the lower nut 73 and the screw 72 until the proper belt tension is obtained. This will lower the screw 72 to accommodate the minimum clearance between the motor bed plate 74 and the motor M. In the case of smaller motors, the screw may be extended relatively upwardly of the bed plate 74, if desired.

It is to be noted that the motor bracket 65 is especially designed in accordance with the present invention to provide an overhang portion extending to the left, as shown in Fig. 4, which takes into account the center of gravity of the motor. Thus, the moment arm measured from the center of gravity of the motor to the flange 20, may be counterpoised with the moment arm of the belt pull measured from the flange 20. This materially reduces the strain and stress on the flange bolts 57 and provides a design wherein the foundation bolts 34 merely support the combined weight of the assembly and torque reaction of the reducer unit, which is negligible compared to the effects of the belt pull in normal applications where the speed reducer and motor are mounted separately of one another. The torque reaction component of the belt pull may amount to as much as 500 pounds.

Figure 12:
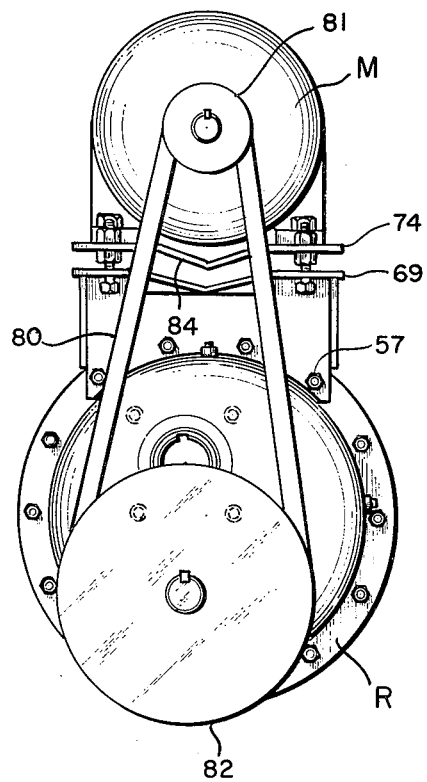
Fig. 12 is illustrative of the embodiment of Figs. 10 and 11, and further illustrating the speed reducer with its input shaft positioned in a "six o'clock" position.

The present invention further provides a shaft mount arrangement of both the motor and reducer unit as may be seen from the views of Figs. 10–12, inclusive, wherein the reducer R is mounted directly upon the drive shaft 90 of a machine, such as a screw conveyor S, which drive shaft is supported by means of an outboard bearing 91 attached to the end plate E. The bearing 91, in turn, supports the shaft 90 extending into the hollow shaft 44 (see Fig. 11). The same effects of mounting the motor bracket 65 as before described, may be obtained in the present embodiment. It will be apparent, however, that the usual torque reaction tie bar 92 or like means, is a necessary addition for counteracting forces tending to rotate the reducer R about the axis of the supporting shaft 90.

It will be apparent from a comparison of the views of Figs. 11 and 12, that the reducer R may be positioned in any manner desired to provide a "three o'clock" position as shown in Fig. 11, a "six o'clock" position as shown in Fig. 12, and respective reverse positions 180 degrees therefrom to a "nine o'clock" position with the input shaft to the left (not shown) and a "twelve o'clock" position (not shown) with the drive input shaft 35 at the top. The motor M together with the motor bracket 65 may remain attached as shown for upright mounting or may be mounted at any of several positions, depending upon spacing of the bolts 57, at either side of the reducer R. The motor M may also be inverted, if desired, from the position shown in Figs. 11 and 12 (not shown). This is accomplished merely by removing the bolts 57 and placing the motor and bracket 65 in the desired position with a suitable length belt 80. If it is so desired, the unit may be assembled for vertical applications, such as with use in agitators having vertical axles with the motor mount being positioned with the high speed shaft 35 in either the upright or down positions (not shown).

It will be apparent that the present invention provides an improved motor-reducer assembly permitting a wide range of variable mountings of the motor relative to the reducer and of the reducer relative to its means of mounting. The reducer may be either shaft mounted or flange mounted, as desired and as hereinabove described, and is adaptable to a wide range of machines including screw conveyors, mixers, agitators, tumblers, crushers, and other devices having an accessible drive shaft. A removable drive shaft or gudgeon is provided which eliminates the need for separate drive-end shafts for screw conveyors and the like. Shaft replacement can be readily made in the field without disturbing the gear unit or other components. The device readily permits the use of trough end seals assembled in a seal retainer housing and may accommodate any of three types of seals: lip seal for maximum protection from contamination, belt seal for conveying dusty materials and waste packing for abrasive materials. Any material that might get past the seal will be expelled through its openings instead of forcing its way into the reducer seal.

It will be apparent that various changes may be made in any of the embodiments of the invention hereinabove specifically described without departing from or sacrificing the advantages of the invention as defined in the appended claims.

I claim:

1. In a machinery drive assembly for a machine having a rotatable shaft and a stationary support member surrounding said shaft, said assembly including a speed reducer unit including a housing, an input shaft and an output shaft and gearing interconnecting said shafts; a motor and drive means arranged to operatively connect said motor with said reducer input shaft, the output shaft of said reducer being arranged for drive connection with said rotatable machine shaft; the combination therewith of a mounting pad arrangement for one side of said reducer housing and providing a relatively flat mounting surface engageable with the outer surface of said stationary machine support member, and a series of tapped openings adapted for receiving foundation mounting bolts from said support member and being radially and angularly spaced from one another about the axis of said reducer output shaft, whereby said reducer may be positioned at several angularly relative positions about the axis of said output shaft.

2. A speed reducer comprising a housing, an input shaft and a hollow output shaft, gearing interconnecting said shafts, said hollow output shaft being arranged to telescopingly receive a removable gudgeon member, the bore of said shaft being enlarged intermediate its ends and provided with removable stop retaining means therein, said gudgeon including a stop element, said stop element and said stop retaining means arranged for removable stop engagement with one another to thereby prevent axial displacement of said gudgeon.

3. A speed reducer comprising a housing, an input shaft and a hollow output shaft, gearing interconnecting said shafts, said hollow output shaft defining a longitudinal bore arranged to telescopingly receive a removable gudgeon member, the bore of said output shaft being enlarged intermediate its ends to define a shoulder therein and an annular groove axially spaced from said shoulder, a thrust plate arranged to provide a marginal edge thereof slidably received in said enlarged bore portion and engageable with said shoulder, a retaining clip adapted to be seated in said annular groove and contact said thrust plate at the side opposite said shoulder to prevent endwise movement thereof, and means for removably attaching said thrust plate to an end of said gudgeon.

4. In a machinery drive assembly arranged for connection with the drive shaft bearing of a machine to be driven thereby, said assembly comprising a motor, a reducer unit including a housing, an input shaft, an output shaft and gearing interconnecting said shafts, and drive means arranged to operatively connect said motor with said reducer input shaft and developing dynamic forces therebetween during operation thereof; the combination therewith of motor support means including a motor support plate and mounting means therefor and arranged for mounting engagement with said reducer housing, said support plate being mounted on said housing to extend laterally in a direction away from said input shaft and adapted to support said motor in a selected position whereby the bending moment exerted by the weight of said motor, at its center of gravity, and measured from the point of engagement of said mounting means and said housing, will be substantially equal to and opposite from the bending moment comprising the said dynamic forces exerted by said drive means and measured from said point of engagement, and wherein the flexural load due to said dynamic forces and imposed upon the said drive shaft bearing will be substantially zero.

5. In a machinery drive assembly arranged for connection with the drive shaft bearing of a machine to be driven thereby, said assembly comprising a motor, a reducer unit including a housing having a laterally extending flange portion, an input shaft, an output shaft and gearing interconnecting said shafts, and drive means arranged to operatively connect said motor with said reducer input shaft and developing dynamic forces therebetween during operation thereof; the combination therewith of motor support means including a motor support plate and angularly extending mounting means therefor and arranged for mounting engagement with the flange of said reducer housing, said support plate being mounted on said flange to extend laterally in a direction away from said input shaft and adapted to support said motor in a selected position whereby the bending moment exerted by the weight of said motor, at its center of gravity, and measured from the point of engagement of said mounting means and said flange, will be substantially equal to and opposite from the bending moment comprising the said dynamic forces exerted by said drive means and measured from said point of engagement, and wherein the flexural load due to said dynamic forces and imposed upon the said drive shaft bearing will be substantially zero.

6. In a machinery drive assembly arranged for connection with the drive shaft bearing of a machine to be driven thereby, said assembly comprising a motor, a reducer unit including a circular housing having a radially extending annular flange, an input shaft, an output shaft and gearing interconnecting said shafts, and drive means arranged to operatively connect said motor with said reducer input shaft and developing dynamic forces therebetween during operation thereof; the combination therewith of a motor support bracket including a motor support plate and a support member extending angularly therefrom and arranged for mounting engagement at selective circumferential positions with the flange of said reducer housing, said support plate being disposed to extend laterally relative to said flange in a direction away from said input shaft and adapted to support said motor in a selected position whereby the bending moment exerted by the weight of said motor, at its center of gravity, and measured from the point of engagement of said support member and said flange, will be substantially equal to and opposite from the bending moment comprising the said dynamic forces exerted by said drive means and measured from said point of engagement, and wherein the flexural load due to said dynamic forces and imposed upon the said drive shaft bearing will be substantially zero.

7. In a machinery drive assembly arranged for connection with the drive shaft bearing of a machine to be driven thereby, said assembly comprising a motor, a reducer unit including a housing, an input shaft, an output shaft and gearing interconnecting said shafts, and drive means comprising an endless belt arranged to operatively connect said motor with said reducer input shaft and developing dynamic forces therebetween during operation thereof; the combination therewith of a motor support bracket including a motor support plate, a support member extending laterally relative thereto and arranged for mounting engagement with said reducer housing, and a motor mounting pad spaced from said support plate and including a plurality of sets of bolt holes, each set corresponding to the bolt spacing of a respective set of motor bolt holes to provide a universal support arrangement, and adjusting bolt and nut assemblies arranged to maintain the spacing between said pad and plate and being further arranged for adjustment of the tension of said interconnecting belt, said support plate being disposed to extend laterally relative to said housing in a direction away from said input shaft and adapted to support said motor in a selected position whereby the bending moment exerted by the weight of said motor, at its center of gravity, and measured from the point of engagement of said support member and said housing, will be substantially equal to and opposite from the bending moment comprising the said dynamic forces exerted by the belt pull of said drive means and measured from said point of engagement, and wherein the flexural load due to belt pull forces and imposed upon the said drive shaft bearing will be substantially zero.

8. In a machinery drive assembly for a machine having a rotatable shaft and a stationary support member surrounding said shaft, said assembly including the combination of a speed reducer unit including a housing, an input shaft and an output shaft and gearing interconnecting said shafts; a motor and drive means arranged to operatively connect said motor with said reducer input shaft and developing dynamic forces therebetween during operation thereof; the combination therewith of motor support means including a motor support plate and mounting means therefor and arranged for mounting engagement with said reducer housing, said support plate being mounted on said housing to extend laterally in a direction away from said input shaft and adapted to support said motor in a selected position whereby the bending moment exerted by the weight of said motor, at its center of gravity, and measured from the point of engagement of said mounting means and said housing, will be substantially equal to and opposite from the bending moment comprising the said dynamic forces exerted by said drive means and measured from said point of engagement, and wherein the flexural load due to said dynamic forces and imposed upon the said drive shaft bearing will be substantially zero; said reducer further including at one side of said housing a mounting pad arrangement providing a relatively flat mounting surface engageable with the outer surface of said stationary machine support member, and a series of tapped openings adapted for receiving foundation mounting bolts from said support member and being radially and angularly spaced from one another about the axis of said reducer output shaft, whereby said reducer may be positioned at several angularly relative positions about the axis of said output shaft.

References Cited in the file of this patent
UNITED STATES PATENTS

| | | |
|---|---|---|
| 1,604,401 | Fisher | Oct. 26, 1926 |
| 1,674,302 | Royle | June 19, 1928 |
| 1,911,666 | Beitz | May 30, 1933 |
| 1,962,707 | Carter | June 12, 1934 |
| 2,079,730 | Blair | May 11, 1937 |
| 2,176,207 | Christensen | Oct. 17, 1939 |
| 2,211,050 | Boice | Aug. 13, 1940 |
| 2,235,972 | Zimmerman | Mar. 25, 1941 |
| 2,516,090 | Korff | July 18, 1950 |
| 2,603,983 | Rieser | July 22, 1952 |
| 2,606,453 | Firth | Aug. 12, 1952 |
| 2,673,790 | Illsley | Mar. 30, 1954 |
| 2,762,232 | Bade | Sept. 11, 1956 |